(12) United States Patent
Tung (10) Patent No.: US 7,796,685 B2
(45) Date of Patent: Sep. 14, 2010

(54) SYSTEMS AND METHODS FOR MINIMUM-POWER LEAKAGE WINDOWING FOR VDSL USING LEAST SQUARE TECHNIQUE

(75) Inventor: Tai-Lai Tung, Irvine, CA (US)

(73) Assignee: Ikanos Communications, Inc., Fremont, CA (US)

( * ) Notice: Subject to any disclaimer, the term of this patent is extended or adjusted under 35 U.S.C. 154(b) by 965 days.

(21) Appl. No.: 11/513,089

(22) Filed: Aug. 31, 2006

(65) Prior Publication Data

US 2007/0047632 A1 Mar. 1, 2007

Related U.S. Application Data

(60) Provisional application No. 60/712,450, filed on Aug. 31, 2005.

(51) Int. Cl.
*H04B 1/38* (2006.01)
(52) U.S. Cl. ............... 375/222; 375/219; 375/220; 370/276; 370/297; 455/73; 725/111
(58) Field of Classification Search ............ 375/219, 375/220, 222; 370/276, 297; 455/73; 725/111
See application file for complete search history.

(56) References Cited

U.S. PATENT DOCUMENTS

| 6,002,722 | A | 12/1999 | Wu |
| 7,349,480 | B2* | 3/2008 | Tsatsanis et al. ............ 375/257 |
| 7,522,515 | B2* | 4/2009 | Tsatsanis et al. ............ 370/210 |

FOREIGN PATENT DOCUMENTS

WO WO 03/105431 12/2003

OTHER PUBLICATIONS

International Search Report mailed May 10, 2007.

* cited by examiner

*Primary Examiner*—David C Payne
*Assistant Examiner*—Leon Flores
(74) *Attorney, Agent, or Firm*—Thomas, Kayden, Horstemeyer & Risley, LLP (57) ABSTRACT

Systems and method for minimum power leakage windowing for VDSL using least squares technique are provided. A coefficient vector is defined for the first N samples. The window is then defined in terms of this coefficient vector. The leakage power of the $K^{th}$ tone is defined in terms of the window. A least squares minimization is performed on the leakage power to determine the optimal value of x. The window is implemented using this value of x, thereby reducing the power leakage in the out-of-band and RFI band regions in the frequency domain.

18 Claims, 7 Drawing Sheets

FIGURE 1

RELATED ART

FIGURE 2

Up to 4096 sub-carriers

SYSTEMS AND METHODS FOR MINIMUM-POWER LEAKAGE WINDOWING FOR VDSL USING LEAST SQUARE TECHNIQUE

CROSS REFERENCE TO RELATED APPLICATION(S)

This application claims priority to provisional patent application No. 60/712,450 filed Aug. 31, 2005, entitled, "Method and System for Minimum-Power Leakage Windowing for VDSL Using Least Squares Technique," the disclosure of which is hereby incorporated by reference in its entirety.

FIELD OF THE INVENTION

The present invention relates generally to the field of telecommunications and, more particularly, to delivering services over telephone (switched) networks (POTS, PSTN) and leased point-to-point two-wire telephone-type circuits, such as via modems or other forms of transceivers operating over twisted pair wires. For example, multi-channel, multi-carrier communications systems such as discrete multi-tone (DMT) systems.

BACKGROUND OF THE INVENTION

The explosive growth of the Internet has created a demand for high data rates for business and residential users (SOHO—small office/house office) that rely on standard analog plain old telephone systems (POTS) that use a copper wire twisted pair to carry the information. The need for high-speed access to the home is increasing due to the availability of information, data, high-bandwidth video and the like, such as from the world wide web. Because of such demand, higher speed modems are required. A multitude of competing communication technologies provide high-speed access to the home such as cable modems and digital subscriber line (xDSL) equipment. DSL equipment may utilize the existing analog POTS that uses a copper wire twisted pair to carry voice and information. Because of bandwidth limitation (4 KHz), and power limitation of the telephone network, line coding schemes are used to encode digital signals into analog signals that convey the analog information over the analog telephone network. Such line coding schemes should avoid the undesirable bandwidth or power increase.

In VDSL systems a transmit window is used to reduce the power leakage in the out-of-band regions and RFI band regions in the frequency domain. In the past, many well-known windows, such as Raised-Cosine window, Chebyshev window, Kaiser Window, Hanning Window, and Hamming Window, have been applied. However, given the strict power-mask constraints defined in the VDSL standard, all the windows mentioned above still induce severe power-leakage in the out-of-band regions and RFI band regions. This requires that many tones around the band transition areas must be turned off to reduce the power leakage. Because turning off bands reduces the lines ability to carrier information, and therefore effectively reduces bandwidth, it is less than desirable.

SUMMARY OF THE INVENTION

In view of the of foregoing problems associated with conventional VDSL systems, various embodiments of the invention mathematically formulate the windowing problem and optimally design a new window function using the least-square (LS) method. The optimization process reduces and ideally minimizes total power-leakage in the specified region, thereby leading to a minimum power-leakage window that has fast decrease in the side lobe and low leakage in the out-of-band regions and RFI band regions.

At least one embodiment of the invention provides a method of shaping an outbound signal in a VDSL transceiver. The method according to this embodiment comprises defining a leakage power function of an $N^{th}$ DMT sub-channel, where N is an integer between 1 and a maximum number of available sub-channels, minimizing the leakage power function, generating a transmit window based on the minimized function, and windowing the outbound signal with transmit window.

Another embodiment of the invention provides a method of forming a transmit window for a DMT-based transceiver. The method according to this embodiment comprises defining a leakage power function of an $N^{th}$ sub-channel of a communication channel, performing a least squares minimization on the leakage power function, and applying a window function to a transmit signal based on an optimum function as determined by the least squares minimization.

An additional embodiment of the invention provides A VDSL modem circuit. The modem circuit according to this embodiment comprises a transceiver including a windowing function block comprising a leakage power function determination module for determining a leakage power function of an $N^{th}$ sub-channel of a VDSL-based communication channel, a least squares minimization module for solving minimizing a total leakage power from sub-channel S to sub-channel N/2−1, where N is the maximum number of sub-channels on the communication channel and S<N, a windowing function determination block that determines an optimum window function for a VDSL communication line based on the leakage power function determination module and least squares minimization module, and a window function application module for applying the optimum window function to an outbound signal.

These and other embodiments and advantages of the present invention will become apparent from the following detailed description, taken in conjunction with the accompanying drawings, illustrating by way of example the principles of the invention.

DETAILED DESCRIPTION

The following description is intended to convey a thorough understanding of the embodiments described by providing a number of specific embodiments and details involving windowing techniques in VDSL systems. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The present invention provides a novel transmit window for VDSL systems. The new window can dramatically reduce the power-leakage in the out-of-band regions and radio frequency interference (RFI) band regions in the frequency domain over existing windowing techniques. The invention may be implemented so that more tones around the band transition areas can be turned on thereby increasing the effective data rate. This invention may be beneficially implemented in VDSL products which typically employ non-rectangular windows. The invention may also be implemented broadly with DMT-based xDSL products such as ADSL, ADSL2, ADSL2+, etc. The invention may be used in conjunction with the standard: T1.424/Trial-Use, "Draft American National Standard for Telecommunications—Interface between Networks and Customer Installations—VDSL Metallic Interface", 2002, which is incorporated by reference herein in its entirety.

Figure 1:
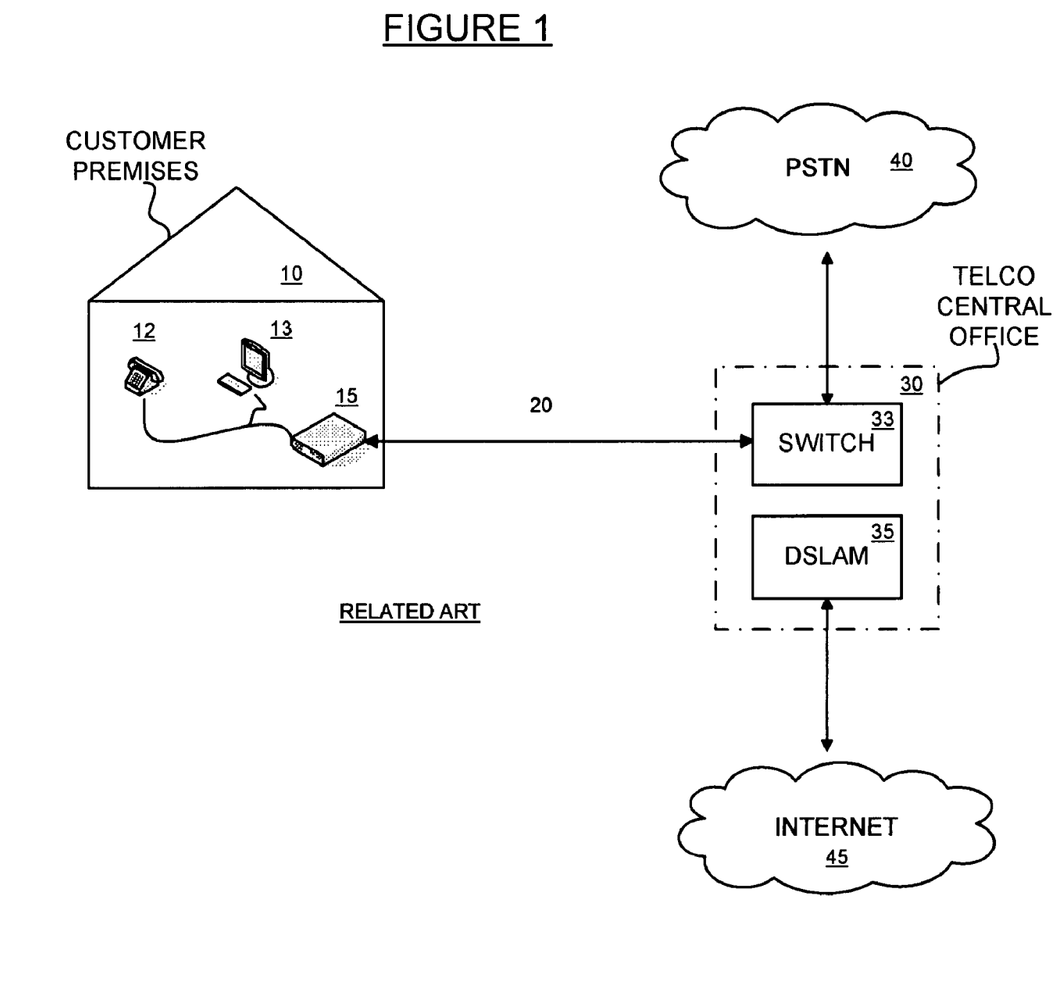
FIG. 1 is a schematic diagram of a conventional point-to-point xDSL communication network.

Referring now to FIG. 1, a schematic diagram of a conventional point-to-point xDSL communication network is depicted. The network includes a customer premises (CPE) 10 and a telecommunication (TELCO) company central office (CO) 30 interconnected through a conventional twisted pair copper communication line 20. It should be appreciated that in various embodiments, the connection between the customer premises 10 and the central office 30 may comprise a fiber optic connection. TELCOs are beginning to implement high speed xDSL in all fiber networks between the CPE 10 and CO 30 as fiber offers higher bandwidth and is not vulnerable to interference from RF signals. At the CPE 10, the xDSL subscriber connects his telephone 12 and computer 13 to the communication line 20 through an xDSL modem 15. In various embodiment the modem 15 or another splitter separates incoming signals based on frequency filtering that distinguishes voice from data. The TELCO CO 30 is connected to both the public switched telephone network 40 and the Internet 45. In various embodiments one or more Internet service providers (ISPs) may connect the CO 30 to the Internet 45. A switch 33 at the CO 30 determines whether signals from the modem 15 are voice or data and routes them accordingly, with the former going to the PSTN 40 and the latter to the DSL access multiplexer DSLAM 35 and ultimately to the Internet 45.

The twisted pair communication line, or for that matter, a fiber optic communication line, is able to simultaneously carry voice and data communications by allocating different portions of the available bandwidth to each. Voice communication requires only a small allocation at the lowest end of the frequency spectrum. Filtering is used to prevent interference between voice and data at the CPE end.

Figure 2:
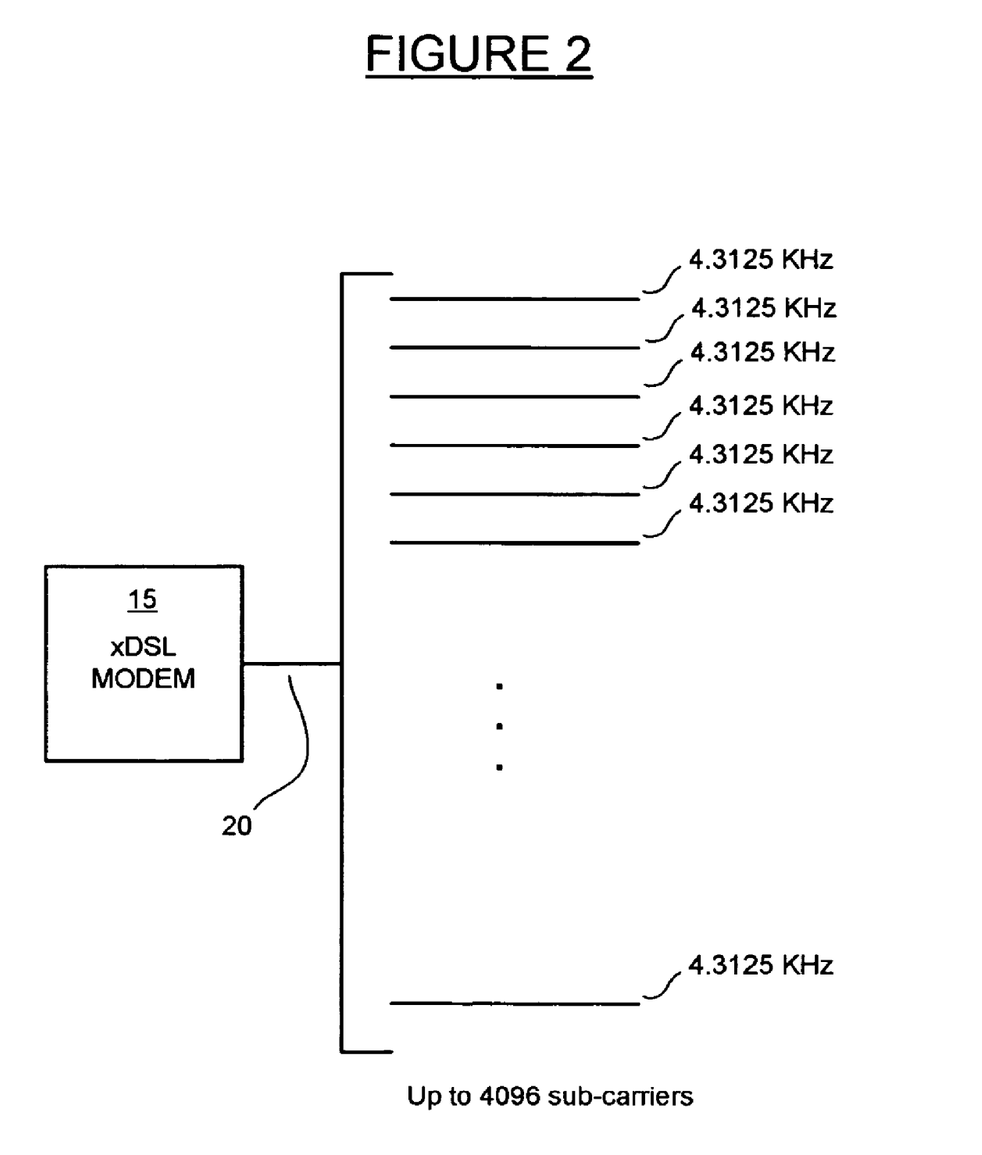
FIG. 2 is block diagram illustrating sub-carrier modulation over a twisted pair communication line in an xDSL-based system.

Referring now to FIG. 2, this Figure illustrates a block diagram that demonstrates sub-carrier modulation over a twisted pair communication line in an xDSL-based system. In discrete multi-tone (DMT) based xDSL systems, the communication channel is divided into a number of sequential, equal width sub-channels sometimes referred to as tones or sub-carriers. Typically these sub-channels or tones are about 4 KHz wide. Data is transmitted simultaneous on these sub-channels based in part on measured characteristics of the sub-channels. That is, interference is often distributed unequally across all sub-channels so that more data may be transmitted on some, less on others, while still others must be completely "turned off." Interference may change with time, temperature, line length or other factors. Thus, the modem 15 will repeatedly measure the line characteristics using a test sequence and adjust bit loading onto the tones based on the detected characteristics of each tone. In VDSL systems, up to 4096 or $2^{12}$ sub-carriers may be utilized. Various other xDSL standards may utilize fewer or more sub-carriers. Each sub-carrier can be thought of as an individual modem. Therefore, instead of operating a single modem as in dial-up service, DMT has the effect of N simultaneous modems where N is the number of sub-carriers simultaneously transmitting data.

Figure 3:
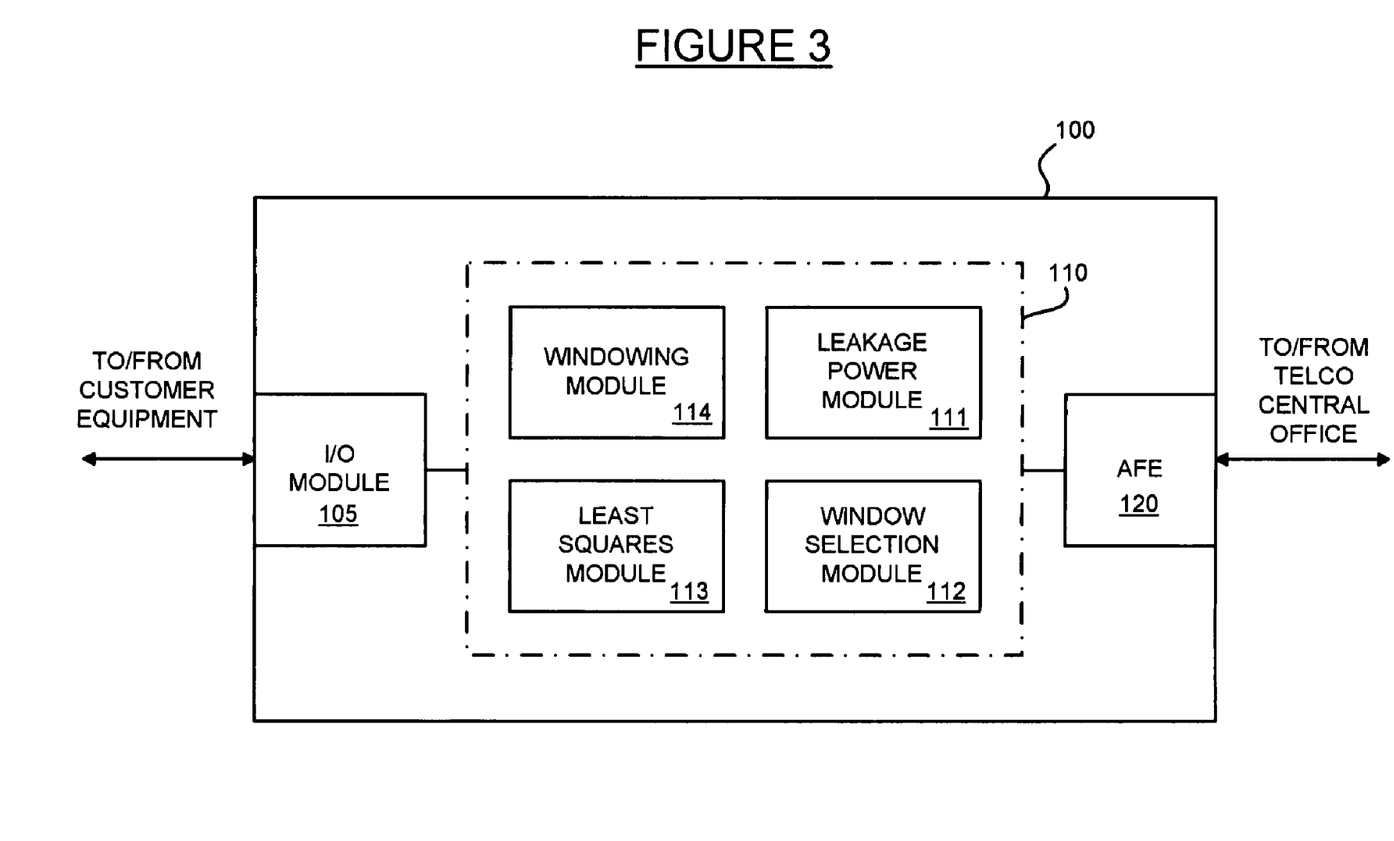
FIG. 3 is a block diagram illustrating components of an xDSL transceiver according to for determining an minimum power leakage window according to at least one embodiment of the invention.

Referring now to FIG. 3, a block diagram illustrating components of an xDSL transceiver for determining a minimum power leakage window according to at least one embodiment of the invention is depicted. The modem 100 includes an input/output (I/O) module 150 that receives data from and provides data to customer equipment such as a personal computer (PC). The modem 100 also comprises a transceiver block 107 including a leakage power determination module 111, a window selection module, a least squares minimization module 113 and a windowing module 114. The modem 100 also includes an analog front end (AFE) 120 that serves as the analog interface to the twisted pair copper communication line. In optical fiber-based DSL, the AFE 120 may be replaced with a digital, light-based emitter/receiver. It should be appreciated that each module may be configured as a circuit, routine or application, as a software application executing on computer hardware, an application specific integrated circuit (ASIC), a combination of hardware and software, or other suitable configuration. Moreover, modules may be combined or broken into multiple additional modules.

During operation, the leakage power determination module 111 determines the leakage power of the $N^{th}$ tone based on a window function and line properties of the communication line between the modem and the central office. Based in part on the leakage power, the least squares minimization module 113 will solve a minimization problem that determines a solution that minimizes a pair of linear equation with respect to a variable. Based on the optimal value of the variable, that is the one yielding the minima, the window selection module 112 designs a window that reduces the and ideally minimizes power leakage, thereby allowing the maximum number of tones to be utilized—increasing the bandwidth of the channel. The windowing module 114 applies the selected window to data transmitted on each tone.

It should also be appreciated that each module depicted in the modem 100 may operate autonomously or under the control of a controller. Furthermore, it should be appreciated that the particular modules illustrated in FIG. 3 are exemplary only and should not be construed as either necessary or exhaustive. In various embodiments, it may be desirable to use more, less or even different modules than those illustrated in FIG. 3.

Figure 4:
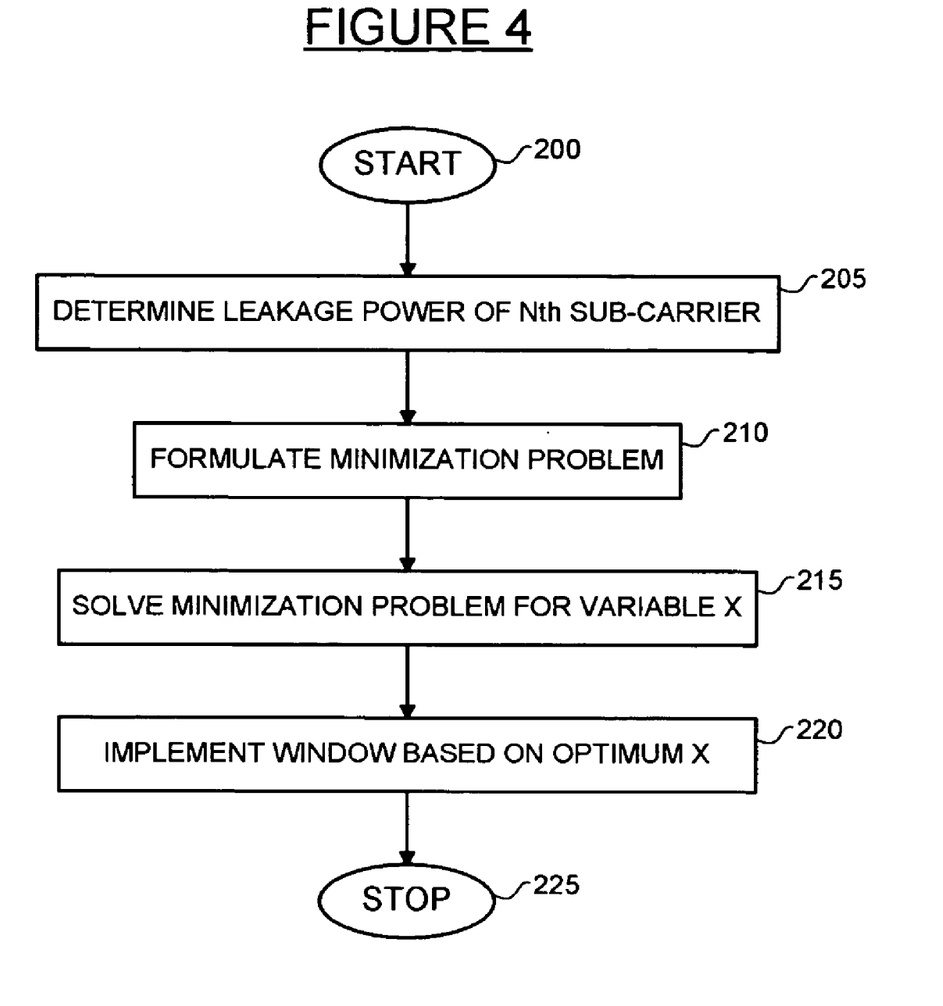
FIG. 4 is a flow chart detailing the steps of a method for determining a minimum power leakage window for non-rectangular VDSL windowing according to at least one embodiment of the invention.

With reference to FIG. 4, this Figure depicts is a flow chart detailing the steps of a method for determining a minimum power leakage window for non-rectangular VDSL windowing according to at least one embodiment of the invention. In various embodiments the method is based on designing an optimum, that is, power-leakage minimizing, window for a VDSL system using mathematical techniques including least squares minimization.

The method of FIG. 4 begins in block 200. In block 205, the leakage power of the $N^{th}$ sub-carrier is determined. In various embodiments, this comprises first expressing the windowing problem mathematically. If $x_{\beta \times 1}$ is designated as the coefficient-vector representing the first $\beta$ samples of the window, the entire window w can be expressed by expression (1) as follows:

$$w = \begin{bmatrix} x_{\beta \times 1} \\ 1_{(L_{cp}-\beta+2N_{sc}+L_{cs}-\beta) \times 1} \\ \text{flipud}(x_{\beta \times 1}) \end{bmatrix}_{(L_{cp}+2N_{sc}+L_{c3}) \times 1} \quad (1)$$

where 1 is an all-one vector, $L_{cp}$ is the length of the cyclic prefix, $L_{cs}$ is the length of the cyclic suffix, $N_{sc}$ is the maximum number of sub-carriers (tones), and flipud(.) is an operation that flips the entry in the column vector up side down. If W is defined as the fast Fourier transform (FFT) results of w, then W=fft(w)=Fw, where F is the Fourier transformed matrix. If N is defined as $N=2N_{sc}$, $L=L_{cp}+2N_{sc}+L_{cs}$, each entry in F can be expressed by expression (2) as follows:

$$F(k,n) = e^{-j\frac{2\pi k n}{N}}, \quad (2)$$
$$k = 0 \sim N/2 - 1,$$
$$n = 0 \sim L - 1$$

Since vector w is symmetric, the absolute value of W can be expressed by expression (3) as follows:

$$|W(0:N/2-1)| = Aw(0:L/2-1), \quad (3)$$

where $$A = 2 \times \begin{bmatrix} 1 & 1 & \cdots & 1 \\ \cos\left(\frac{\pi(L-1)}{N}\right) & \cos\left(\frac{\pi(L-3)}{N}\right) & \cdots & \cos\left(\frac{\pi}{N}\right) \\ \vdots & \vdots & \ddots & \vdots \\ \cos\left(\frac{\pi(N/2-1)(L-1)}{N}\right) & \cos\left(\frac{\pi(N/2-1)(L-3)}{N}\right) & \cdots & \cos\left(\frac{\pi(N/2-1)}{N}\right) \end{bmatrix}_{\frac{N}{2} \times \frac{L}{2}}.$$

The leakage power of the $k^{th}$ tone is therefore given by $[Aw]_k$, k=0: N/2−1.

Next, in block 210, a minimization problem is formulated based on the leakage power determined in block 205. To minimize the total leakage-power from tone s to tone N/2−1, the minimization problem is formulated by expression (4) as follows:

$$\text{Min}|A(s:N/2-1,:)w|^2 \quad (4)$$

where s is a user defined parameter, that is the number of current tone. The minimization problem can therefore be expressed by expression (5)

$$\text{Min}|A_1 x + B|^2 \quad (5)$$

where $A_1 = A(0:N/2-1, 0:\beta-1)$, $B=A_2 1$, $A_2 = A(0:N/2-1, \beta:L-1)$, and 1 is an all one vector.

After formulation of the minimization problem, in block 215, the minimization problem must be solved for variable x. If arbitrary function P is defined as $P=|A_1 x+B|^2 = x^H A_1^H A_1 x + B^H B + 2x^H A_1^H B$, the result is a summation of a quadratic equation and a linear equation. Therefore, function P is a convex function in terms of x, and the minimum of P is attainable when optimum x makes the gradient of P to be zero. The gradient of P is given by the expression (6) as follows:

$$\nabla P = 2A_1^H A_1 x + 2A^H B \quad (6)$$

Thus, the optimum x is the solution of the following linear equations:

$$A_1^H A_1 x_{opt} = -A_1^H B,$$

$$x_{opt} = -(A_1^H A_1)^{-1} A_1^H B.$$

In block 220, the optimal window is implemented based on the solution to the optimum value for x, $x_{opt}$. In various embodiments, the optimal window may be implemented using a digital signal processor (DSP) or other programmable logic in the modem transceiver. The optimum value for x, $x_{opt}$ is a vector.

Figure 5:
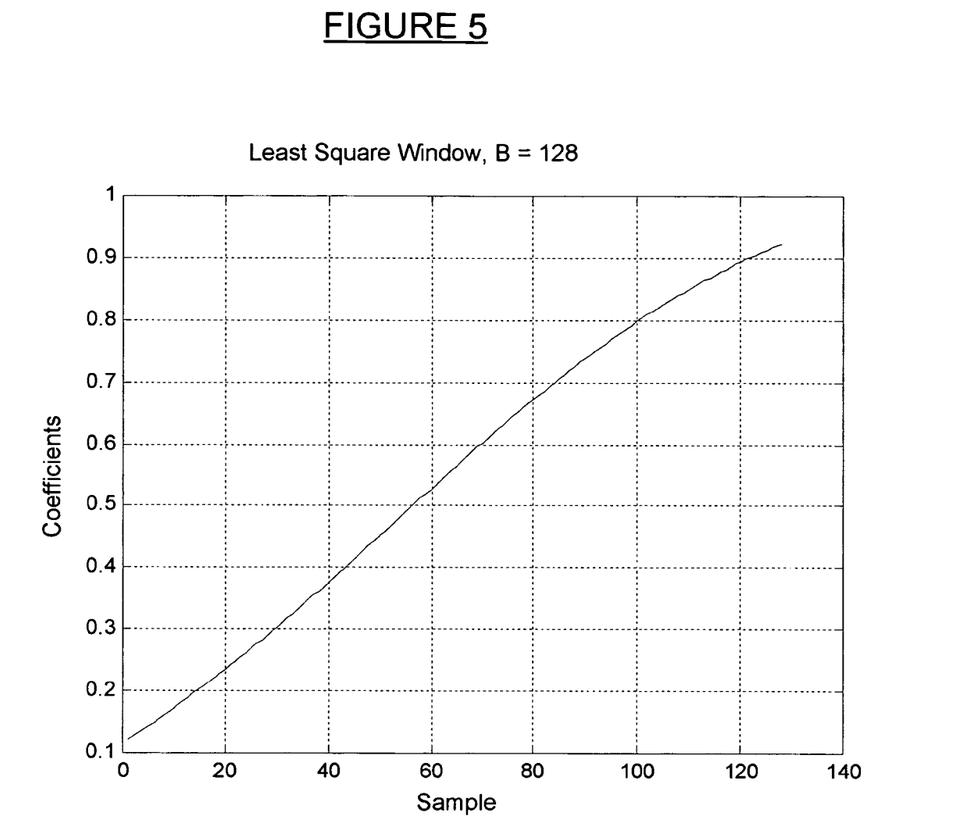
FIG. 5 is a graph illustrating the first 128 samples of an optimal VDSL window obtained through the systems and methods according to at least one embodiment of the invention.

FIG. 5 is a graph illustrating the first 128 samples of an optimal VDSL window obtained through the systems and methods according to at least one embodiment of the invention. FIG. 5 shows the values of the vector x_opt. First the window is applied for the first 128 samples of one frame in time domain. Then, the window is flipped and applied for the last 128 samples of same frame in time domain. This process is repeated with the same window for all frames.

Figure 6:
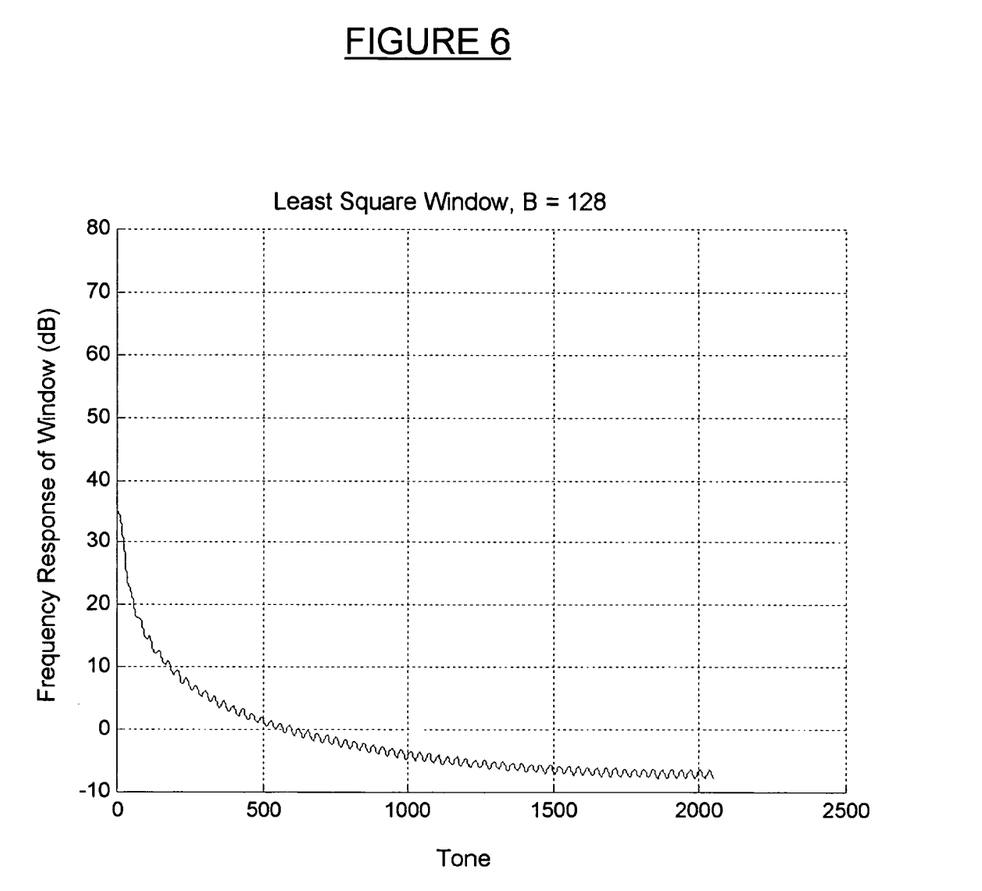
FIG. 6 is a graph illustrating the frequency response of an optimal VDSL window obtained through the systems and methods according to at least one embodiment of the invention.

FIG. 6 is a graph illustrating the frequency response of an optimal VDSL window obtained through the systems and methods according to at least one embodiment of the invention. The graph of FIG. 6 shows the LS window has small sidelobe in the frequency domain. Therefore, it will help reduce the leakage to neighboring tones.

Figure 7:
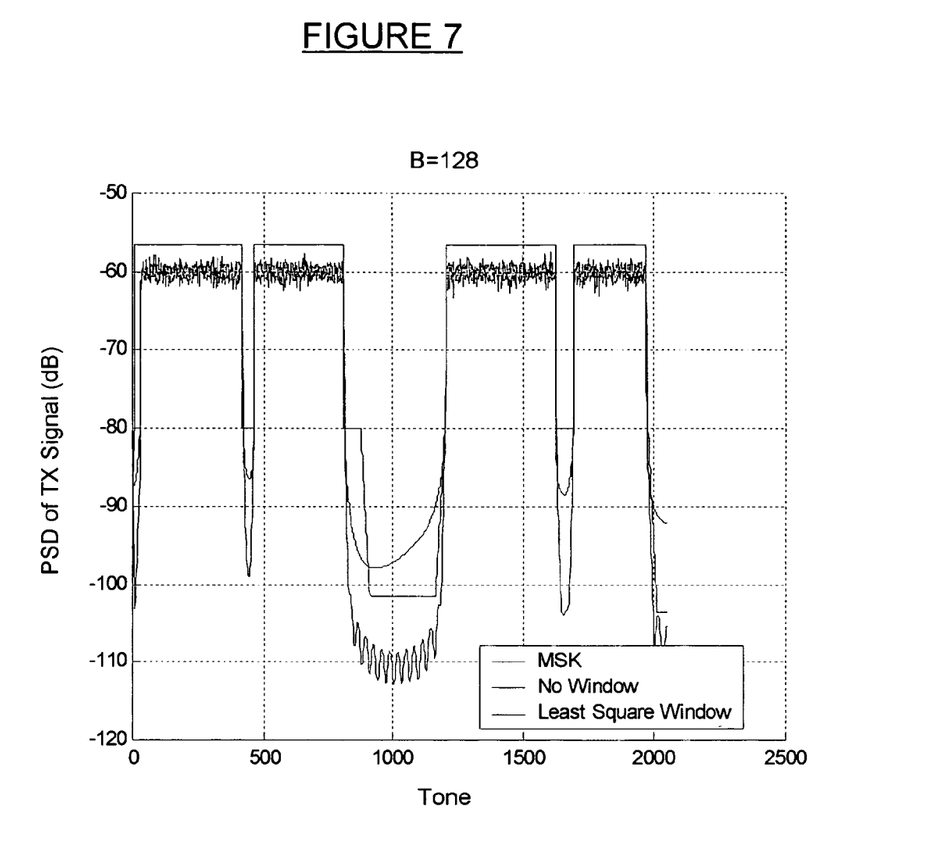
FIG. 7 is a graph illustrating the performance, that is, power spectral density of the transmitted signal for each tone, of an optimal VDSL window obtained through the systems and methods according to at least one embodiment of the invention.

FIG. 7 is a graph illustrating the performance, that is, power spectral density (PSD) of the transmitted signal for each tone, of an optimal VDSL window obtained through the systems and methods according to at least one embodiment of the invention. The PSDs of the transmit signals with and without the optimal windowing are both presented in the Figure. It is observed that the optimal least squares window can dramatically reduce the power-leakage in the out-of-band regions and radio frequency interference (RFI) band regions in the frequency domain. Thus, if no windowing is applied, or if windowing with something other than the ideal vector is applied, more tones must be turned off in the boundary make the overall leakage below the PSD of the MSK. With optimal windowing according to the various embodiments of the invention less tones are backed off. Because the number of tones backed off directly decrease the transmission rate, turning off less tones is an improvement. Therefore, the strict power mask constraints (MSK) defined in the VDSL standard can be satisfied with a reduced and ideally minimized reduction in transmission rate.

The invention preferably operates in every stage to meet the power mask constraints defined in the VDSL standards. In VDSL downstream, it operates at the Central Office (CO) side when transmitting downstream signal. In VDSL upstream, it operates at customer premises (CPE) side when transmitting upstream signal.

The embodiments of the present inventions are not to be limited in scope by the specific embodiments described herein. For example, although many of the embodiments disclosed herein have been described in the context of VDSL systems, other embodiments, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Many modifications to the embodiments described above can be made without departing from the spirit and scope of the invention. Accordingly, the claims set forth below should be construed in view of the full breath and spirit of the embodiments of the present inventions as disclosed herein. Also, while the foregoing description includes many details and specificities, it is to be understood that these have been included for purposes of explanation only, and are not to be interpreted as limitations of the present invention.

The invention claimed is:

1. A method of shaping an outbound signal in a very high bitrate digital subscriber line (VDSL) transceiver comprising:

defining, using a leakage power module at the VDSL transceiver, a leakage power function of an $N^{th}$ discrete multi-tone (DMT) sub-channel, where N is an integer between 1 and a maximum number of available sub-channels, wherein defining a leakage power function of an $N^{th}$ DMT sub-channel comprises defining a function $[Aw]_k$, where w is the window function, A is the matrix, $$A = 2x \begin{bmatrix} 1 & 1 & \cdots & 1 \\ \cos\left(\frac{\pi(L-1)}{N}\right) & \cos\left(\frac{\pi(L-3)}{N}\right) & \cdots & \cos\left(\frac{\pi}{N}\right) \\ \vdots & \vdots & \ddots & \vdots \\ \cos\left(\frac{\pi(N/2-1)(L-1)}{N}\right) & \cos\left(\frac{\pi(N/2-1)(L-3)}{N}\right) & \cdots & \cos\left(\frac{\pi(N/2-1)}{N}\right) \end{bmatrix}_{\frac{N}{2} \times \frac{L}{2}}$$ and $$k = 0 : \frac{N}{2} - 1;$$

minimizing the leakage power function based on the defined leakage power function;

generating a transmit window based on the minimized function; and reducing power leakage by windowing the outbound signal transmit window.

2. The method according to claim 1, wherein minimizing the leakage power function comprises performing the minimization problem $\text{Min}|A_1 x + B|^2$, where $$A_1 = A\left(0 : \frac{N}{2} - 1, 0 : \beta - 1\right), \quad B = A_2 1, \text{ and}$$

$$A_2 = A\left(0 : \frac{N}{2} - 1, \beta : L - 1\right),$$

and where 1 is an all one vector.

3. The method according to claim 2, wherein minimizing the leakage power function further comprises defining a function $P = |A_1 x + B|^2 = x^H A_1^H A_1 x + B^H B + 2x^H A_1^H B$, wherein the minimum of P is attained at the value of x that makes the gradient of P equal to zero.

4. The method according to claim 3, wherein gradient of P is given by the expression $\nabla P = 2A_1^H A_1 x + 2A^H B$.

5. The method according to claim 3, wherein the value of x that makes the gradient of P equal to zero is attained by the solution of linear equations $A_1^H A_1 x_{opt} = -A_1^H B$ and $x_{opt} = -(A_1^H A_1)^{-1} A_1^H B$.

6. The method according to claim 1, wherein the maximum number of available sub-channels is 4096.

7. A method of forming a transmit window for a discrete multi-tone (DMT)-based transceiver comprising:

defining, using a leakage power module at the very high bitrate digital subscriber line (VDSL) transceiver, a leakage power function of an $N^{th}$ sub-channel of a communication channel, wherein defining a leakage power function of an $N^{th}$ sub-channel comprises defining a function $[Aw]_k$, where w is the window function, A is the matrix, $$A = 2x \begin{bmatrix} 1 & 1 & \cdots & 1 \\ \cos\left(\frac{\pi(L-1)}{N}\right) & \cos\left(\frac{\pi(L-3)}{N}\right) & \cdots & \cos\left(\frac{\pi}{N}\right) \\ \vdots & \vdots & \ddots & \vdots \\ \cos\left(\frac{\pi(N/2-1)(L-1)}{N}\right) & \cos\left(\frac{\pi(N/2-1)(L-3)}{N}\right) & \cdots & \cos\left(\frac{\pi(N/2-1)}{N}\right) \end{bmatrix}_{\frac{N}{2} \times \frac{L}{2}}$$ and $$k = 0 : \frac{N}{2} - 1;$$

performing a least squares minimization on the leakage power function; and reducing power leakage by applying a window function to a transmit signal based on an optimum function as determined by the least squares minimization.

8. The method according to claim 7, wherein performing a least squares minimization on the leakage power function comprises performing the minimization problem $\text{Min}|A_1x+B|^2$, where $$A_1 = A\left(0 : \frac{N}{2} - 1, 0 : \beta - 1\right), \quad B = A_2 1, \text{ and}$$

$$A_2 = A\left(0 : \frac{N}{2} - 1, \beta : L - 1\right),$$

and where 1 is an all one vector.

9. The method according to claim 8, wherein minimizing the leakage power function further comprises defining a function $P=|A_1x+B|^2=x^H A_1^H A_1 x + B^H B + 2x^H A_1^H B$, wherein the minimum of P is attained at the value of x that makes the gradient of P equal to zero.

10. The method according to claim 9, wherein gradient of P is given by the expression $\nabla P = 2A_1^H A_1 x + 2A^H B$.

11. The method according to claim 9, wherein the value of x that makes the gradient of P equal to zero is attained by the solution of linear equations $A_1^H A_1 x_{opt} = -A_1^H B$ and $x_{opt} = -(A_1^H A_1)^{-1} A_1^H B$.

12. The method according to claim 7, wherein N is an integer ranging from 1 to 4096.

13. A very high bitrate digital subscriber line (VDSL) modem circuit comprising:
a transceiver including a windowing function block comprising:
a leakage power function determination module for determining a leakage power function of an $N^{th}$ sub-channel of a VDSL-based communication channel;
a least squares minimization module for solving minimizing a total leakage power from sub-channel S to sub-channel N/2−1, where N is the maximum number of sub-channels on the communication channel and S<N;

a windowing function determination module that determines an optimum window function for a VDSL communication line based on the leakage power function determination module and least squares minimization module, wherein the leakage power function determination module is adapted to determine a leakage power function of an $N^{th}$ sub-channel comprises defining a function $[Aw]_k$, where w is the window function, A is the matrix, $$A = 2x \begin{bmatrix} 1 & 1 & \cdots & 1 \\ \cos\left(\frac{\pi(L-1)}{N}\right) & \cos\left(\frac{\pi(L-3)}{N}\right) & \cdots & \cos\left(\frac{\pi}{N}\right) \\ \vdots & \vdots & \ddots & \vdots \\ \cos\left(\frac{\pi(N/2-1)(L-1)}{N}\right) & \cos\left(\frac{\pi(N/2-1)(L-3)}{N}\right) & \cdots & \cos\left(\frac{\pi(N/2-1)}{N}\right) \end{bmatrix}_{\frac{N}{2} \times \frac{L}{2}}$$ ; and a window function application module for applying the optimum window function to an outbound signal.

14. The modem circuit according to claim 13, wherein the least squares minimization module is adapted to perform a least squares minimization on the leakage power function comprising the minimization problem $\text{Min}|A_1x+B|^2$, where $$A_1 = A\left(0 : \frac{N}{2} - 1, 0 : \beta - 1\right), \quad B = A_2 1, \text{ and}$$

$$A_2 = A\left(0 : \frac{N}{2} - 1, \beta : L - 1\right),$$

and where 1 is an all one vector.

15. The modem circuit according to claim 14, wherein the least squares minimization module is further adapted to derive $aP=|A_1x+B|^2=x^H A_1^H A_1 x + B^H B + 2x^H A_1^H B$, wherein the minimum of P is attained at the value of x that makes the gradient of P equal to zero.

16. The modem circuit according to claim 15, wherein gradient of P is given by the expression $\nabla P = 2A_1^H A_1 x + 2A^H B$.

17. The modem circuit according to claim 15, wherein the value of x that makes the gradient of P equal to zero is attained by the solution of linear equations $A_1^H A_1 x_{opt} = -A_1^H B$ and $x_{opt} = -(A_1^H A_1)^{-1} A_1^H B$.

18. The modem circuit according to claim 13, wherein N is an integer ranging from 1 to 4096.

* * * * *

UNITED STATES PATENT AND TRADEMARK OFFICE
CERTIFICATE OF CORRECTION

| | | |
|---|---|---|
| PATENT NO. | : 7,796,685 B2 | Page 1 of 1 |
| APPLICATION NO. | : 11/513089 | |
| DATED | : September 14, 2010 | |
| INVENTOR(S) | : Tai-Lai Tung | |

It is certified that error appears in the above-identified patent and that said Letters Patent is hereby corrected as shown below:

*Column 9, line 45, claim 2: remove the equation*

$$P = \{A_1 x + B\}^2 = x^H A_1^H A_1 x + B^H B + 2x^H A_1^H B$$

and replace with $$P = |A_1 x + B|^2 = x^H A_1^H A_1 x + B^H B + 2x^H A_1^H B$$

Signed and Sealed this
Fourth Day of October, 2011

David J. Kappos
*Director of the United States Patent and Trademark Office*